Nov. 22, 1955     D. C. BOND ET AL     2,724,267

METHOD FOR MEASURING FLOW OF FLUID IN EARTH BORES

Filed Aug. 26, 1948

INVENTORS
DONALD C. BOND
NELSON B. RUSSELL
BY Edward H. Lang
ATTORNEY

United States Patent Office 2,724,267
Patented Nov. 22, 1955

2,724,267

METHOD FOR MEASURING FLOW OF FLUID IN EARTH BORES

Donald C. Bond, Northbrook, and Nelson B. Russell, Winnetka, Ill., assignors to The Pure Oil Company, Chicago, Ill., a corporation of Ohio Application August 26, 1948, Serial No. 46,272

7 Claims. (Cl. 73—155)

This invention relates to a method and apparatus for controlling the flow of fluid into an earth formation during flooding or secondary recovery operations and relating its flow to the permeability of the particular formation which the fluid is to penetrate.

The problem of fluid flow control into an earth formation as it develops in the flooding of an oil well is more complex than the simple one of metering the amount of fluid passing into a well, because, although the quantity of fluid can be accurately measured at the surface, the quantity entering a particular formation or passing a specific point within the well may vary substantially. This variation in the rate of flow within the well is primarily due to two causes: first, the well bore is not uniform in diameter and, therefore, the linear velocity of water flowing therethrough changes; and, second, the permeability of a given formation can be such that it will absorb much of the fluid flowing. Since it is frequently desired to flood a specific formation, it is necessary to be able to direct the flow of fluid thereinto.

Accordingly, it is a fundamental object of the instant invention to provide an apparatus for measuring the rate of flow of fluids within a well.

It is another object of the invention to provide a method and apparatus for controlling the rate of fluid injection into a well based on the rate of flow of fluid past a point within the well bore.

Other objects and advantages of the invention will in part be obvious and in part appear hereinafter.

This invention, accordingly, comprises a method and apparatus for measuring and controlling the injection of fluid into a well, which method involves the steps and combinations of steps as related to each other and which apparatus includes the features of construction, combinations of elements, and arrangements of parts, all to be described more particularly hereinafter. In brief, the method contemplates the measurement of flow of fluid within the well by injecting a component at a known or determinable rate into the fluid at a point in the well, the component being one which will alter a physical property of the fluid, and, at a point removed therefrom, determining the appropriate physical property thereof to obtain an estimate of the rate of flow of fluid, and recording or transmitting the information concerning that property of the fluid to the surface of the earth, where it can be used to control the rate of injection into the well. The apparatus comprises an injector which, for example, can take the form of an acid receptacle and a pump capable of delivering acid at a constant rate to a liquid to alter the conductivity or pH thereof. The second section of the apparatus comprises a detector carrying a pair of electrodes and measuring means, together with means for transmitting a signal to a recorder or to the surface.

In the figures accompanying this application,

Figures 1, 2:
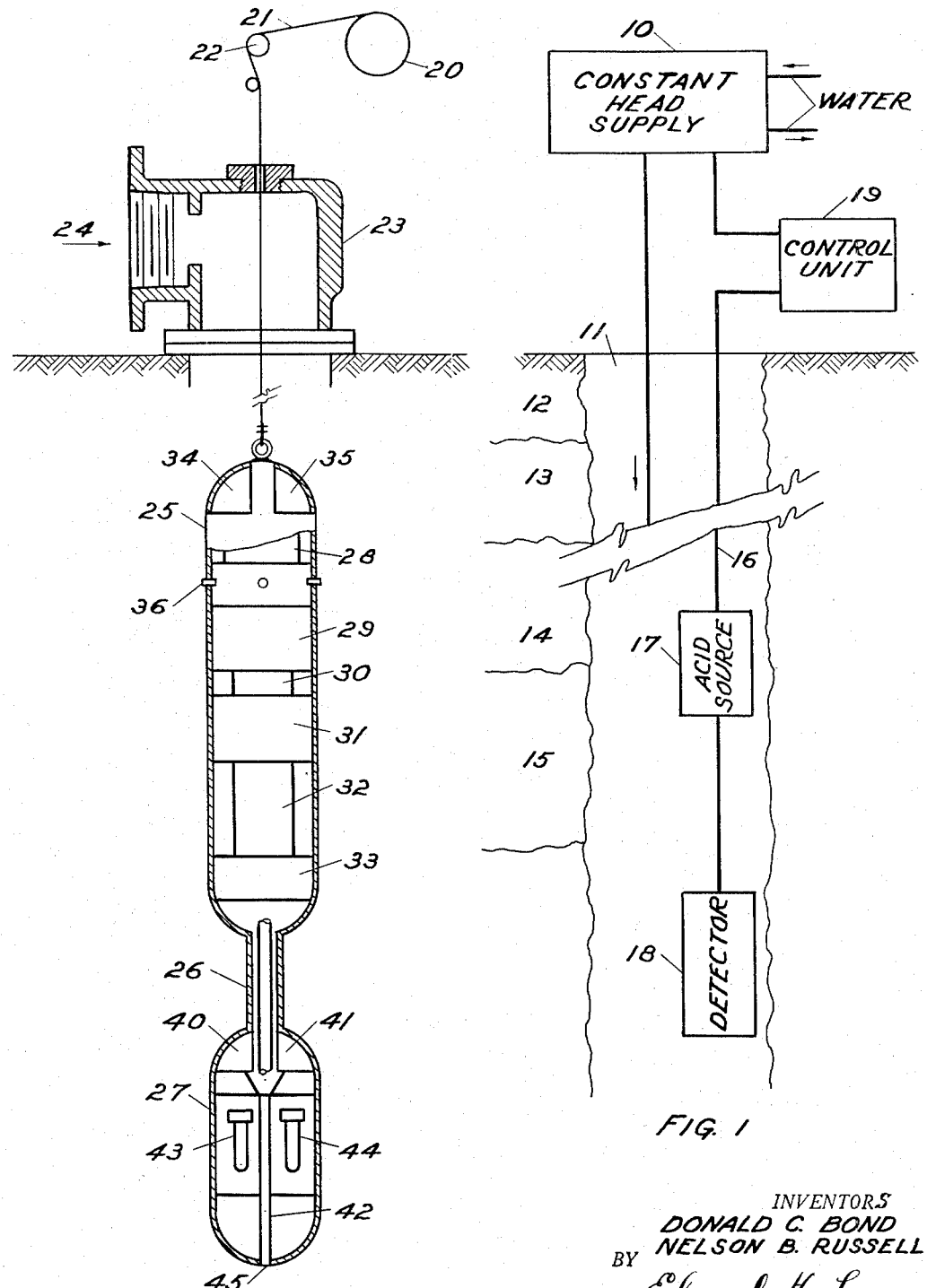
Figure 1 is a drawing somewhat diagrammatic in form showing the arrangement of an acid source and detector adapted to be suspended on cables and dropped into a well for making fluid flow measurements based on conductivity or pH which measurements are convertible into permeability figures.
Figure 2 is a diagrammatic showing of a specific embodiment of the apparatus.

Referring now to Figure 1, 10 represents a constant-head source of water feeding it to a well 11 which is bored through formations 12, 13, 14 and 15. Within the well, carried by cable 16 is an acid source and metering pump 17 capable of delivering at a constant known rate. At a point a known fixed distance below the acid source 17 is a detector 18 which can be connected to a control unit 19 at the surface. Mixing of the water and acid takes place over the fixed distance separating the acid source from the detector and the acidity or conductivity of the water at the level of the detector is measured and transmitted to the control unit 19 at the surface.

When water is injected into the well from the surface of the earth at about a constant rate, it will flow into the various strata occurring above and below the level at which the acid source is suspended. Mixing of water and acid occurs in the interval separating the source and detector. Because a fixed known quantity of acid is injected into the water, its degree of dilution will be a measure of the rate at which water is flowing past the detector. The difference between this rate and that at which water is passed into the well at the surface is a measure of the amount which has entered the strata between the surface and the point of measurement.

It is apparent that the success of the method in obtaining a useful signal within the well bore is dependent materially on obtaining a large change in the property used for the measurement with a relatively small amount of acid. E. M. F. changes of 100 to 400 millivolts are produced by pH changes of a few units, which in turn are brought about by the injection of acid into water at the rate of about 1 gallon per hour into water flowing at the rate of about 4 to 50 barrels per hour. These flow rates are common in field operations employing flooding and the consumption of the acid is not significant in the amount of water consumed. Measurements of the conductivity or dielectric properties of the water-acid mixture can be made, but because the change obtained with a pH measurement is sharper, it is preferred.

Water and a strongly ionized acid, such as hydrochloric, or sulfuric, make a good combination for making the necessary study. The acid in small amount will make a large change in the pH of the water with which it is mixed, which change, in turn, is readily detected with a pH meter. The signal thus derived is transmitted to a recorder forming part of the apparatus or to the surface where it can be applied to a control unit at the water source to adjust the rate of flow.

Naturally, for the proper adjusting of the method, calibration of the detector, or pH meter, at the surface is in order for the method which employs water to be used in the well. That is to say, absolute calibration of the apparatus based upon distilled water would be of doubtful validity, because those conditions which determine the nature of a water to be used require that individual calibrations be made for individual wells.

By reference to Figure 1, it will be clear that although the specific embodiment described has involved the use of water and an acid together with a measurement of conductivity or pH to obtain an indication of the rate of fluid flow past specific points in the well, it should be apparent that other combinations of material can be used. For example, water, or any clear liquid, can be used as the injection fluid and the measuring can be performed photometrically by injecting a dye solution into the water stream at a point corresponding to that indicated as satisfactory for the injection of the acid. Suitable dyes are those not adsorbed by the formations in the well. Among satisfactory ones are methyl violet and methylene blue. Substantially the same apparatus as that used to inject an acid solution into the water can be used. The dye is injected at a rate which will provide for a satisfactory coloration of the water to permit easy measurement of the concentration photometrically. Because the absorption of light by a colored solution follows an exponential law when it is related to the concentration of the color in the solution, delicate measurements can readily be made on dilute solutions of colored materials, because it is in low ranges that the greatest change in absorptivity of light occurs. Thus, by the inclusion of a light source and a photocell in the detection unit 18 and providing a conduit through which the colored liquid can pass, the solution can be subjected to a light absorption measurement. The electrical signal derived therefrom can be readily relayed to the surface and the control unit 19 as indicated.

A specific embodiment of an apparatus in the form of a flow recorder is described and claimed in detail in the copending application Serial No. 46,276 filed of even date herewith by Ronald R. Proctor and Donald J. Wangelin. In Figure 2 there is shown a schematic diagram of that apparatus and it includes a windlass 20, controlling the feeding of a cable 21 over a pulley 22 through a gland head 23, having an inlet for water 24. The apparatus carried by the cable consists of a cartridge 25 containing a dye or acid source with coupling 26 connecting the cartridge to the measuring or detecting unit 27. In the cartridge 25 there are the dye injector 28, a recorder 29, driven by a motor 30, an amplifier 31, motor generator 32 and batteries 33. Pressure equalizing openings 34, 35 for the cartridge are provided at the head thereof, and a dye exit at 36. A similar construction is shown for the detecting unit 27 which includes water inlets 40 and 41, merging into transparent conduit 42 which passes between the light source 43 and a photocell 44. A water outlet 45 is shown as the termination of the conduit.

In operation, electrical connection is provided between the batteries, motor generator, amplifier and motor on the recorder in substantially conventional manner, so that electrical energy is readily supplied to the dye injector which may consist essentially of a constant delivery pump. Water passes into the inlets 34, 35, past the dye injector and out through the outlet 36 carrying with it a known amount of dye solution. The water then passes down around the cartridge and in the space between the point of dye injection and the detecting unit, thorough mixing of the water and solution occurs so that a colored solution enters the water inlets 40 and 41, passes down between the light source and photocell and out through the water exit. The degree of coloration of the water solution by the dye is detected by a diminution in the amount of light received by the photocell, which in turn relays the signal up to the recorder via electrical conduits carried through tube 26.

It is apparent that with instruments of the type described, carrying recorders, or relaying information to the surface where it can be separately recorded, the complete determination of the rate at which water is flowing past specific points in the well can be obtained. The difference between this rate of flow and the total rate of injection of water into the well is a measure of the amount of water which has passed into the strata occurring between the surface and the point of measurement. Appropriate deductions can then be made about the rate of flow into separate strata and, therefrom, information can be obtained about the most strategic points at which packing-off can be accomplished.

By combining flooding with packing-off of various strata in the well to restrict flow into a given section thereof, the total rate of flow at various points in the well can be determined and from these figures, the permeability of the several strata can be deduced in conventional style. It has been pointed out that the principal advantage of the method resides in its independence of the diameter of the hole at any of the points where measurements are taken.

Fluids other than water can be used, provided an electrical property which shows a measurable change is used. For example, the rate of flow of a gas being passed into a well can be measured if there is injected into it an easily detected component. If the injection gas is a hydrocarbon, a small amount of another component, such as water or acid vapor, will so alter its dielectric properties that a measurable signal can be obtained with a detector of the capacity bridge type. Similarly, the added component could be made to react with a second component at the detector and the heat of reaction measured by means of a resistance bridge. Hydrogen chloride vapor in a hydrocarbon gas would provide a useful signal in both cases mentioned. That is, it would alter the dielectric constant of a gas with which it was admixed to give a good signal; also, it would react with a base in a detector to give an easily measured signal.

Though the apparatus has been described with only a limited number of specific examples, it is to be understood that they are to be interpreted as illustrative of the invention and not as limitations thereon.

What is claimed is:

1. The method of determining the relative permeability of an earth stratum of a well bore and individual earth formations thereof under actual flow conditions during well flooding operations which comprises continuously forcing a known fluid under pressure into said well bore and into said formations, continuously injecting at a constant rate into said known fluid a small amount of an agent capable of altering a physical property of said fluid, said alteration in property being capable of measurement by electrical means, continuously lowering the locus of injection of said agent into said earth bore at a rate substantially less than the rate of flow of fluid so that said agent is picked up by said fluid and carried past an electrical detecting means to detect the presence of said agent in said fluid, continuously detecting the presence of said injected agent at a point immediately downstream therefrom at successively deeper positions along said earth formations to obtain a signal proportional to the change in concentration of said injected agent as said fluid flows into the earth formations, said signal being proportional to the rate of flow of fluid into and past said formation, and recording said signals in relation to the depth of said detecting points.

2. The method in accordance with claim 1 in which the known fluid forced into said well bore is water and the added agent is an electrolyte.

3. The method in accordance with claim 1 in which the known fluid forced into said well bore is a gas and the added agent is a vapor.

4. The method in accordance with claim 1 in which the known fluid forced into said well bore is a liquid and the added agent is a coloring agent.

5. The method in accordance with claim 1 in which the known fluid forced into said well bore is water, the added agent is an acid, and the electrical detecting means is a pH measuring device.

6. The method in accordance with claim 1 in which the known fluid forced into said well bore is water and the added agent is a dye, and the electrical detecting means is a photometric measuring apparatus.

7. The method in accordance with claim 1 in which the known fluid forced into said well bore is a gas, the added agent is a vapor which will alter the dielectric constant thereof, and the electrical detecting means is a dielectric measuring unit.

(References on following page)

References Cited in the file of this patent

UNITED STATES PATENTS

| | | |
|---|---|---|
| 1,002,635 | Bratowski | Sept. 5, 1911 |
| 1,861,332 | Waitz | May 31, 1932 |
| 1,977,359 | Styer | Oct. 16, 1934 |
| 2,203,720 | Dale | June 11, 1940 |
| 2,289,755 | Chamberlain et al. | July 14, 1942 |
| 2,317,039 | Ennis | Apr. 20, 1943 |
| 2,333,164 | Fisher | Nov. 2, 1943 |
| 2,379,138 | Fitting et al. | June 26, 1945 |
| 2,385,378 | Piety | Sept. 25, 1945 |
| 2,429,577 | French | Oct. 21, 1947 |
| 2,453,456 | Piety | Nov. 9, 1948 |
| 2,473,713 | Kingston et al. | June 21, 1949 |
| 2,513,562 | Holuba | July 4, 1950 |